US011763304B1

(12) United States Patent
Hecht

(10) Patent No.: US 11,763,304 B1
(45) Date of Patent: Sep. 19, 2023

(54) USER AND ENTITY AUTHENTICATION THROUGH AN INFORMATION STORAGE AND COMMUNICATION SYSTEM

(71) Applicant: Wells Fargo Bank, N.A., San Francisco, CA (US)

(72) Inventor: Al Hecht, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 53 days.

(21) Appl. No.: 17/558,286

(22) Filed: Dec. 21, 2021

Related U.S. Application Data

(63) Continuation of application No. 15/985,917, filed on May 22, 2018, now Pat. No. 11,232,449, which is a continuation of application No. 14/195,297, filed on Mar. 3, 2014, now Pat. No. 10,055,732.

(60) Provisional application No. 61/922,482, filed on Dec. 31, 2013, provisional application No. 61/806,686, filed on Mar. 29, 2013.

(51) Int. Cl.
G06Q 20/00 (2012.01)
G06Q 20/40 (2012.01)
G06Q 20/36 (2012.01)

(52) U.S. Cl.
CPC ..... *G06Q 20/4014* (2013.01); *G06Q 20/3674* (2013.01); *G06Q 20/40* (2013.01); *G06Q 20/401* (2013.01); *G06Q 20/405* (2013.01)

(58) Field of Classification Search
CPC .......... G06Q 20/4014; G06Q 20/3674; G06Q 20/40; G06Q 20/401; G06Q 20/405

USPC .............................................. 705/16, 21, 59
See application file for complete search history.

(56) References Cited

U.S. PATENT DOCUMENTS

| | | |
|---|---|---|
| 5,521,815 A | 5/1996 | Rose, Jr. |
| 5,978,774 A | 11/1999 | Rogers et al. |
| 6,085,172 A | 7/2000 | Junger |
| 6,587,835 B1 | 7/2003 | Treyz et al. |
| 6,850,902 B1 | 2/2005 | Finch |
| 6,898,598 B2 | 5/2005 | Himmel et al. |
| 6,912,507 B1 | 6/2005 | Phillips et al. |
| 6,934,686 B1 | 8/2005 | Rajagopalan |
| 7,099,850 B1 | 8/2006 | Mann et al. |
| 7,162,451 B2 | 1/2007 | Berger et al. |
| 7,266,533 B2 | 9/2007 | Karas et al. |
| 7,343,551 B1 | 3/2008 | Bourdev |
| 7,689,508 B2 | 3/2010 | Davis et al. |
| 7,766,223 B1 | 8/2010 | Mello et al. |

(Continued)

*Primary Examiner* — Dante Ravetti
(74) *Attorney, Agent, or Firm* — Foley & Lardner LLP

(57) ABSTRACT

Systems and methods for authenticating parties and transactions are described herein. The systems and methods may be part of an information wallet system. The information wallet system or a separate authentication system in communication with the information wallet system may facilitate verification and/or authentication of the parties. In one embodiment, the authentication system includes an authentication server configured to receive an authentication request from a first party to authenticate a second party. The authentication server is further configured to transmit an information request the second party. The authentication server is configured to receive second party information and to configured to compare the second party information with a verified second party information. The authentication server is configured to transmit an authentication result to the first party device.

20 Claims, 9 Drawing Sheets

(56) References Cited

U.S. PATENT DOCUMENTS

| | | |
|---|---|---|
| 7,778,934 B2 | 8/2010 | Graves et al. |
| 7,822,065 B2 | 10/2010 | Lu |
| 7,991,652 B2 | 8/2011 | Chamberlain |
| 8,117,444 B2 | 2/2012 | Takatori et al. |
| 8,121,983 B2 | 2/2012 | Prahlad et al. |
| 8,260,806 B2 | 9/2012 | Steele et al. |
| 8,452,654 B1 | 5/2013 | Wooters et al. |
| 8,583,549 B1 | 11/2013 | Mohsenzadeh |
| 8,606,640 B2 | 12/2013 | Brody et al. |
| 8,612,349 B1 | 12/2013 | Ledder et al. |
| 8,646,060 B1 | 2/2014 | Ben Ayed |
| 8,825,757 B2 | 9/2014 | Lunt et al. |
| 8,977,408 B1 | 3/2015 | Cazanas et al. |
| 9,292,484 B1 | 3/2016 | Plow et al. |
| 10,037,561 B1 | 7/2018 | Hecht |
| 10,217,108 B1 | 2/2019 | Hecht |
| 10,572,725 B1 | 2/2020 | Becker et al. |
| 2001/0053980 A1 | 12/2001 | Suliman et al. |
| 2002/0179704 A1 | 12/2002 | Deaton |
| 2003/0028427 A1 | 2/2003 | Dutta et al. |
| 2003/0074265 A1 | 4/2003 | Oshima |
| 2003/0130907 A1 | 7/2003 | Karas et al. |
| 2004/0122685 A1 | 6/2004 | Bunce |
| 2005/0033650 A1 | 2/2005 | Robertson |
| 2005/0097320 A1 | 5/2005 | Golan et al. |
| 2005/0210263 A1 | 9/2005 | Levas et al. |
| 2005/0250538 A1 | 11/2005 | Narasimhan et al. |
| 2006/0179404 A1 | 8/2006 | Yolleck et al. |
| 2006/0208065 A1 | 9/2006 | Mendelovich et al. |
| 2006/0259380 A1 | 11/2006 | Milstein et al. |
| 2007/0162338 A1 | 7/2007 | Lawe |
| 2007/0168175 A1 | 7/2007 | Fux et al. |
| 2007/0255564 A1 | 11/2007 | Yee et al. |
| 2008/0010298 A1 | 1/2008 | Steele et al. |
| 2008/0052184 A1 | 2/2008 | Junger et al. |
| 2008/0071627 A1 | 3/2008 | Junger |
| 2008/0117966 A1 | 5/2008 | Topiwala et al. |
| 2009/0006646 A1 | 1/2009 | Duarte |
| 2009/0008384 A1 | 1/2009 | Roux |
| 2009/0076966 A1 | 3/2009 | Bishop et al. |
| 2009/0083847 A1 | 3/2009 | Fadell et al. |
| 2009/0132392 A1 | 5/2009 | Davis et al. |
| 2009/0132415 A1 | 5/2009 | Davis et al. |
| 2009/0234764 A1 | 9/2009 | Friesen |
| 2010/0005034 A1 | 1/2010 | Carpenter et al. |
| 2010/0030578 A1 | 2/2010 | Siddique et al. |
| 2010/0137008 A1 | 6/2010 | Li et al. |
| 2010/0191570 A1 | 7/2010 | Michaud et al. |
| 2010/0205091 A1 | 8/2010 | Graziano et al. |
| 2010/0250364 A1 | 9/2010 | Song et al. |
| 2011/0004921 A1 | 1/2011 | Homer et al. |
| 2011/0020130 A1 | 1/2011 | Murakami et al. |
| 2011/0022483 A1 | 1/2011 | Hammad |
| 2011/0022681 A1 | 1/2011 | Simeonov |
| 2011/0035788 A1 | 2/2011 | White et al. |
| 2011/0106698 A1 | 5/2011 | Isaacson et al. |
| 2011/0179061 A1 | 7/2011 | Chilakamarri et al. |
| 2011/0201306 A1 | 8/2011 | Ali Al-Harbi |
| 2011/0276478 A1 | 11/2011 | Hirson et al. |
| 2011/0307375 A1 | 12/2011 | Maney |
| 2012/0022944 A1 | 1/2012 | Volpi |
| 2012/0041877 A1 | 2/2012 | Rao |
| 2012/0066262 A1 | 3/2012 | Greenberg |
| 2012/0095855 A1* | 4/2012 | Sterling ............. G06Q 30/0613 705/16 |
| 2012/0150643 A1 | 6/2012 | Wolfe et al. |
| 2012/0150731 A1 | 6/2012 | Isaacson et al. |
| 2012/0150743 A1 | 6/2012 | Isaacson et al. |
| 2012/0179325 A1 | 7/2012 | Faenger |
| 2012/0191615 A1 | 7/2012 | Schibuk |
| 2012/0203750 A1 | 8/2012 | Vaananen |
| 2012/0239581 A1 | 9/2012 | Mosher |
| 2012/0271712 A1 | 10/2012 | Katzin et al. |
| 2013/0013512 A1 | 1/2013 | Cloud et al. |
| 2013/0024327 A1 | 1/2013 | Nargizian |
| 2013/0030934 A1 | 1/2013 | Bakshi et al. |
| 2013/0073365 A1 | 3/2013 | Mccarthy |
| 2013/0080289 A1 | 3/2013 | Roy et al. |
| 2013/0110639 A1 | 5/2013 | So et al. |
| 2013/0117087 A1 | 5/2013 | Coppinger |
| 2013/0132219 A1 | 5/2013 | Liberty |
| 2013/0198598 A1 | 8/2013 | Kirsch |
| 2013/0246258 A1 | 9/2013 | Dessert |
| 2013/0325588 A1 | 12/2013 | Kalyanam et al. |
| 2013/0332342 A1 | 12/2013 | Kasower |
| 2013/0332826 A1 | 12/2013 | Karunamuni et al. |
| 2013/0340052 A1 | 12/2013 | Jakobsson |
| 2014/0067564 A1 | 3/2014 | Yuan |
| 2014/0164082 A1 | 6/2014 | Sun et al. |
| 2014/0214626 A1 | 7/2014 | Bowers et al. |
| 2014/0229375 A1 | 8/2014 | Zaytzsev et al. |
| 2014/0244365 A1 | 8/2014 | Price et al. |
| 2014/0244487 A1 | 8/2014 | Seligmann et al. |
| 2014/0379521 A1 | 12/2014 | Novotny et al. |
| 2015/0052064 A1 | 2/2015 | Karpenko et al. |
| 2015/0088337 A1 | 3/2015 | Toohy et al. |
| 2015/0128241 A1 | 5/2015 | Jakobsson |
| 2015/0220924 A1 | 8/2015 | Bakker |
| 2015/0248664 A1 | 9/2015 | Makhdumi et al. |
| 2015/0339652 A1 | 11/2015 | Park et al. |
| 2015/0356562 A1 | 12/2015 | Siddens et al. |
| 2016/0062972 A1 | 3/2016 | Ramakrishnan et al. |
| 2016/0203213 A1 | 7/2016 | Lewis et al. |
| 2016/0239887 A1 | 8/2016 | Zhao et al. |
| 2017/0262421 A1 | 9/2017 | Yue |
| 2018/0181866 A1 | 6/2018 | Dalle et al. |
| 2018/0314711 A1 | 11/2018 | Botner et al. |
| 2019/0108909 A1 | 4/2019 | Lee et al. |

* cited by examiner

USER AND ENTITY AUTHENTICATION THROUGH AN INFORMATION STORAGE AND COMMUNICATION SYSTEM

CROSS-REFERENCE TO RELATED PATENT APPLICATIONS

This application is a continuation of U.S. patent application Ser. No. 15/985,917 entitled "USER AND ENTITY AUTHENTICATION THROUGH AN INFORMATION STORAGE AND COMMUNICATION SYSTEM," filed on May 22, 2018, which is a continuation of U.S. patent application Ser. No. 14/195,297 entitled "USER AND ENTITY AUTHENTICATION THROUGH AN INFORMATION STORAGE AND COMMUNICATION SYSTEM," filed on Mar. 3, 2014, which claims priority to U.S. Provisional Patent Application No. 61/806,686, entitled "SYSTEMS AND METHODS FOR INFORMATION STORAGE AND COMMUNICATION," filed on Mar. 29, 2013, and to U.S. Provisional Patent Application No. 61/922,482, entitled "USER AND ENTITY AUTHENTICATION THROUGH AN INFORMATION STORAGE AND COMMUNICATION SYSTEM," filed on Dec. 31, 2013, all of which are incorporated by reference in their entireties and for all purposes.

BACKGROUND

Individuals are often asked to provide information in connection with receiving various goods or services. Often times, individuals are asked to verify their identities with a second party involved in the transaction, be it another individual, a group of individuals, a commercial entity, or a government entity. In many cases, the individuals authenticate themselves by providing government issued identifications (e.g., drivers' licenses, social security numbers, birth certificates, passports, state identifications, etc.), biometric data (e.g., fingerprints, voice samples, retina scans, facial image data, etc.), passwords, personal identification numbers ("PINs"), other personal information (e.g., mother's maiden name, date of birth, height, weight, answers to security questions, etc.), or a combination thereof. Providing this information may become cumbersome and/or overly burdensome depending on the number of authentications needed. For example, in certain banking transactions, a person may be required to present a driver's license, a card and a PIN. This requires that the person take out and locate her driver's, the card and license and remember a PIN specific with the bank involved in the transaction. These issues may be further magnified in situations where the person or entity is entering into a series of repeated transactions or a multiparty transaction, wherein each transaction requires some form of authentication.

In other situations, an individual entering into a transaction with a second party for goods or services provided by the second party may want to verify the second party's identity. For example, a person purchasing a car from a seller may want to ensure that he is not purchasing a stolen car. Accordingly, the purchaser may want to verify that the seller is the same person identified as the owner on the title of the car.

SUMMARY

One embodiment of the invention relates to an authentication system for authenticating parties. The authentication system includes an authentication server having a memory and a processor. The processor is configured to receive an authentication request from the first party device, wherein the first party device is associated with a first party wherein the authorization request includes a request to authenticate an identity of a second party. The processor is further configured to transmit an information request to the second party device, wherein the second party device is associated with the second party. The processor is configured to receive a second party information. The processor is further configured to compare the second party information with a verified second party information. The processor is configured to transmit an authentication result to the first party device.

Another embodiment of the invention relates to a method of authenticating parties in an authentication system, the authentication system includes a server having a memory and a processor. The method includes receiving, at the server, an authentication request from a first party device associated with a first party, wherein the authorization request includes a request to authenticate an identity of a second party. The method further includes transmitting, by the server, an information request to a second party device associated with the second party. The method includes receiving, at the server, a second party information from the second party device. The method further includes comparing, by the server, the second party information with a verified second party information stored in a database. The method includes transmitting, by the server, an authentication result to the first party device.

A further embodiment of the invention relates to a method of verifying an intention of a first party to enter into a transaction with a second party in an authentication system, the authentication system including an authentication server and a party information database. The method includes receiving, at the authentication server, a transaction authentication request from a first party device associated with a first party, wherein the authorization request includes information relating to a pending transaction between the first party and a second party. The method further includes transmitting, by the authentication server, an verification request to a second party device associated with the second party. The method includes receiving, at the server, a second party information from the second party device. The method further includes transmitting, by the server, a result to the first party device.

DETAILED DESCRIPTION

The systems and methods, described in greater detail below, provide an information wallet system configured to receive information from a user and enable the user to communicate the information in a highly secure, convenient, efficient, time-saving, and cost-effective manner. As described below with respect to FIGS. 1-5, the systems and methods may allow merchants and other businesses to reduce their reliance on technologies such as card swipe, card readers, cash machines, custom kiosks, cash registers, specialized scanners, etc. The information may be stored in the cloud and/or locally on the customer's device. In some arrangements, the information may be stored at an external storage system associated with another entity. A token may link data stored at the external storage system to the information wallet such that the information may be accessed by the information wallet system. The information may also be stored in a financial institution computing system maintained by the financial institution. The information may be accessible to the individual and other entities, with the approval of the user, using a mobile device (i.e. laptop, mobile phone, tablet, portable gaming device, and portable electronic device) or other computing devices (i.e. desktop computer).

Users of the information wallet system can submit and request verification information while transacting with other parties. The users and parties may be individuals, businesses, organizations, governments, groups, clubs, other entities, or the like. The information stored in the information wallet system may be stored in a highly secure manner and may be previously verified (e.g., by the user or a third party). The institution storing the user's information within the information wallet system may be trusted by both the user and by the individuals or entities transacting with the user. For example, the institution may be a bank. The institution or a separate authentication server in communication with the information wallet system may facilitate verification and/or authentication of the parties involved with the transaction via Internet and/or secure networks and information wallet clients (e.g., a website, a computer program, a smartphone application, a tablet computer application, etc.) accessible by the parties involved in the transaction. The details of the authentication process are described in further detail below with respect to FIGS. 6-9.

Figure 1:
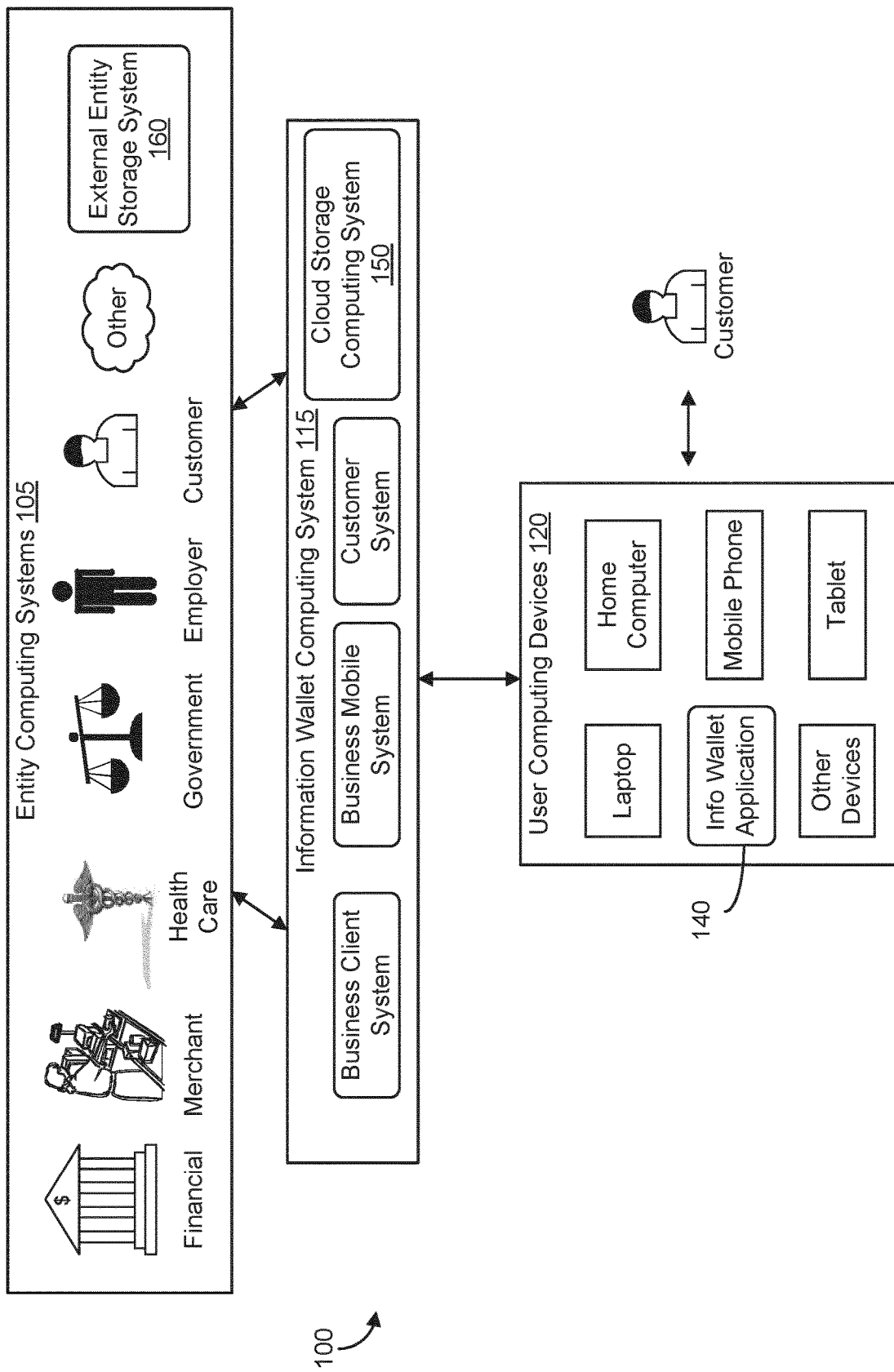
FIG. 1 is a schematic diagram of a computer-implemented information wallet system according to an example embodiment.
Figure 2:
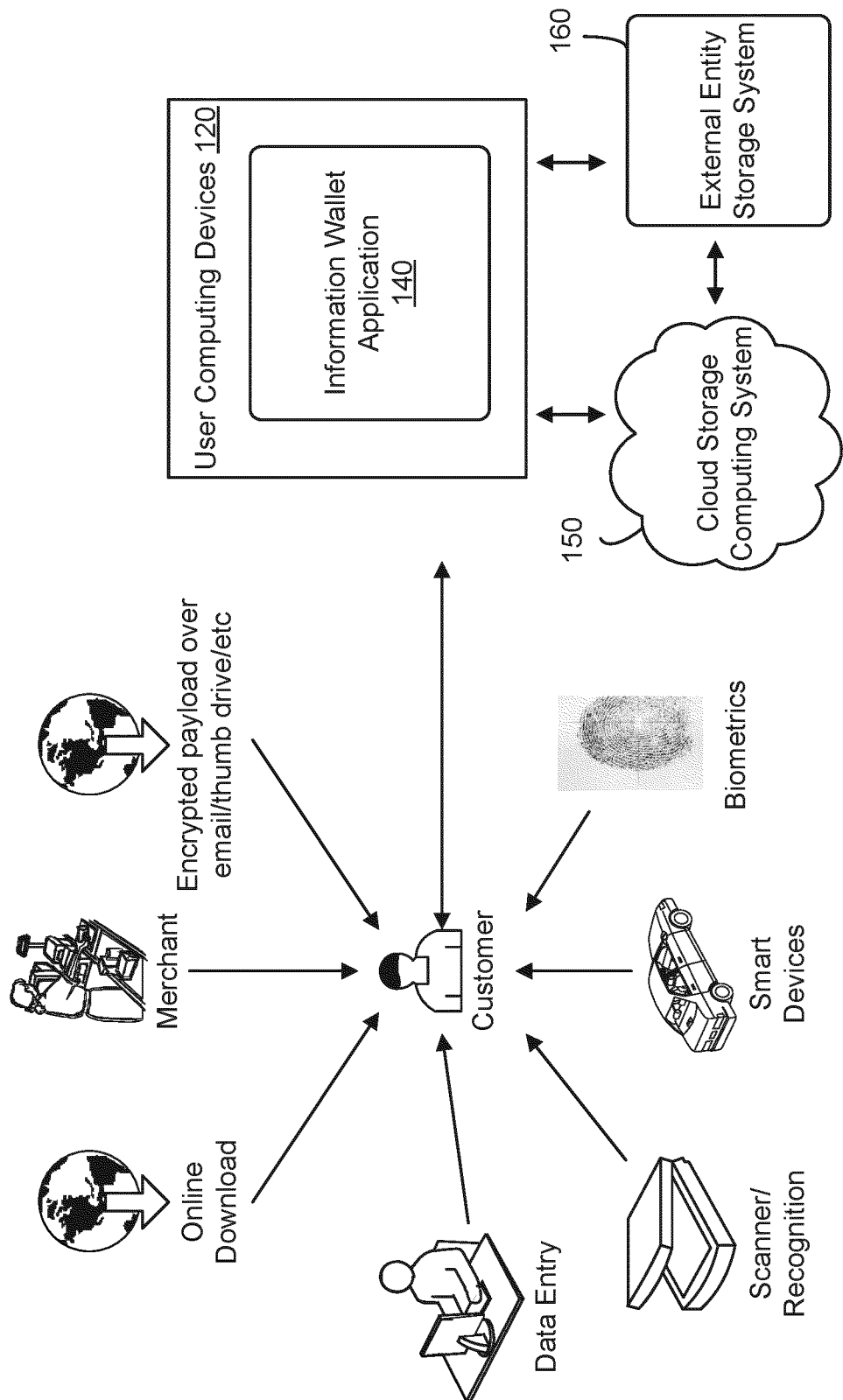
FIG. 2 is a schematic diagram of a computer-implemented information receiving system of the information wallet system in FIG. 1 according to an example embodiment.
Figure 3:
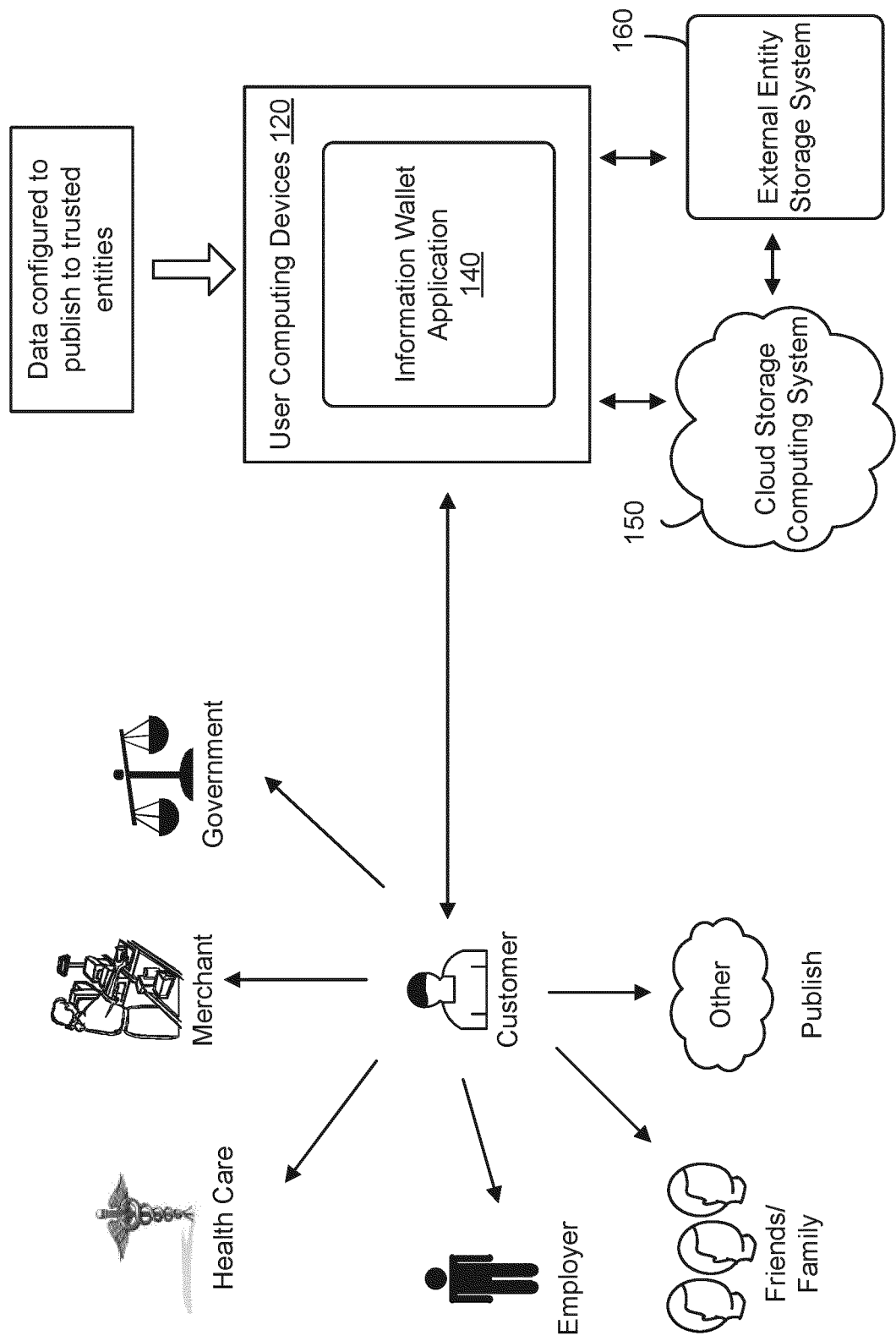
FIG. 3 is a schematic diagram of a computer-implemented information sharing system of the information wallet system of FIG. 1 according to an example embodiment.
Figure 5:
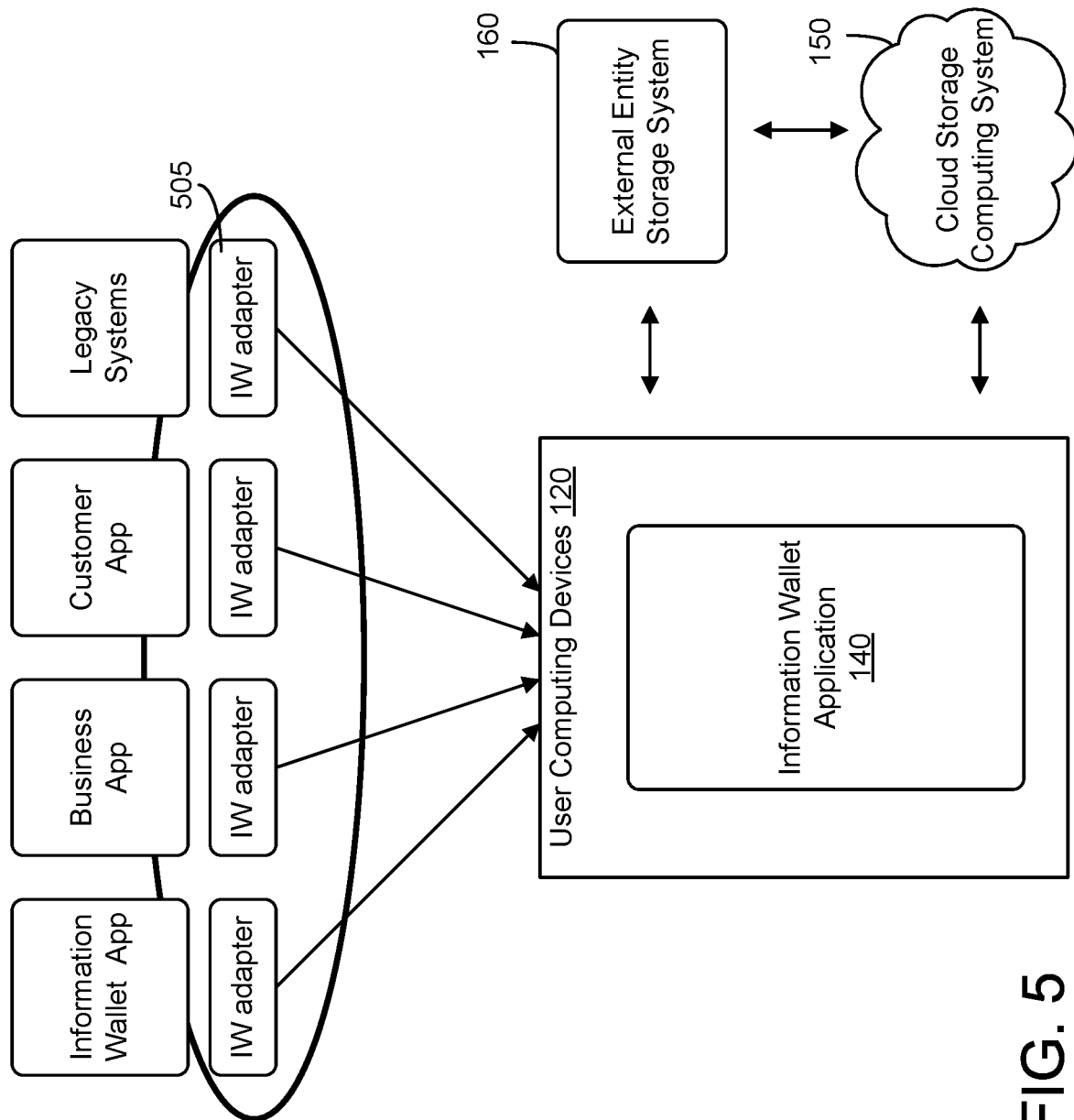
FIG. 5 is a diagram showing information synchronization between various adapters and user applications according to an example embodiment.

Referring to FIG. 1, a computer-implemented information wallet system 100 is shown that may be used by a customer (also referred throughout as a user) to set up and utilize an information wallet account using a user computing device 120 (i.e. laptop, mobile phone, tablet, or home computer). In the various embodiments, data storage and other functionality for the information wallet system 100 may include a cloud-based storage computing system 150 and/or other functionality provided by the information wallet computing system 115. The information wallet computing system 115, in one example embodiment, may be provided a financial institution computing system (e.g., a bank computing system). The user may be an individual consumer that may have one or more accounts with the financial institution and has also established an information wallet account with the financial institution. In another embodiment, the user may not have a financial account with the financial institution but may nevertheless have established an information wallet account with the financial institution. The information wallet system 100 is configured to meet the varied needs of users in the embodiments above and embodiments discussed below. In other embodiments, the information wallet system 100 may be provided by other entity computing systems 105. Other entity computing systems may comprise a second financial institution, a merchant, a health care organization, a government organization, an employer, a customer, or other entity with a computing system. The other entity computing systems 105 may store data that is accessed by the information wallet system 100 (e.g., in external entity storage systems 160 as shown in FIGS. 2, 3, and 5). The information wallet system 100 may include a link out to the data stored in the other entity computing systems 105 such that the data stored by the other entity computing systems 105 is seamlessly accessed by the information wallet computing systems 115. The information wallet computing system 115 may be used to facilitate storing information and communicating stored information to one or more entities, potentially via a user computing device 120.

The financial institution may include a financial institution computing system. The computing system may include various storage, such as banking servers, configured to store data relating to a plurality of customer accounts, financial records, and other documents. The stored data may be backed up in multiple data centers, for example, data centers that are geographically diverse. The computing system may include account management logic (e.g., programming modules stored in a memory and configured to be executed by a processor, such as the processor of the banking server). The account management logic may be part of the banking servers or may reside on a separate server within the computing system. The account management logic perform any typical functions and transactions associated with managing and maintaining a bank account for a customer, including, but not limited to opening new accounts, closing existing accounts, crediting accounts, debiting accounts, transferring funds between accounts, processing debit and credit card transactions, calculating and applying interest, calculating balances, performing account transfers, processing electronic bill payment transactions, and the like. The account management logic may include transaction processing logic to perform the above recited tasks. The account management logic may be configured to manage a plurality of types of accounts, including but not limited to demand deposit accounts (e.g., checking accounts, savings accounts, etc.), credit card accounts, lines of credit, and the like. The financial institution computing system may include interface logic configured to connect the financial institution computing system to computing systems associated with the plurality of users by way of a communication network. The financial institution computing system may include import logic configured to import financial statements regarding the financial accounts on a scheduled basis and/or to import user-provided documents on a user-determined timing basis.

Referring to FIG. 1, information wallet system 100 may include, among other systems, entity computing systems 105 (i.e. a merchant computing system and/or a financial institution computing system), an information wallet computing systems 115, a user computing device 120 (which may include a laptop, home computer, mobile phone, tablet, or any other computing devices), and cloud storage computing systems 150. The computing systems and devices 105, 115, 120, and 150 may communicate through a cloud network, which may include one or more of the Internet, cellular network, near field communication (NFC), Bluetooth connection, Wi-Fi, Wi-Max, a proprietary banking network, etc. The entity computing systems 105, information wallet computing systems 115, user computing devices 120, and cloud storage computing systems 150 may each comprise a computer system (e.g., comprising one or more processors) configured to execute instructions, send and receive data stored in non-transitory memory, and perform other operations to implement the operations and functions described herein associated with logic or processes as shown in the figures and discussed throughout the disclosure.

The entity computing systems 105 are implemented by entities that interact to exchange information with users. Such entities, as described above, may include a financial institution, a merchant of goods or services, a health care organization, a government organization, an employer, a customer, or any other entity or combination of entities. The entity computing system 105 may, for example, be provided by any entity that provides goods or services to consumers. The entities may enter into transactions with the user and/or may exchange information with the user. For example, the entity computing systems 105 may implement an Internet destination (e.g., website) where users may obtain user names/login IDs or otherwise become registered members. Registration of the users as members could allow a user and entity to connect quickly and securely, determine and share a variety of relevant information, and optimize the shared information to meet both the user and entity needs. As another example, the entity computing systems 105 may be provided at a bricks and mortar location where the user receives goods or services, such as a store, a hospital, a restaurant, a hotel, etc. The information exchanged may, for example, relate to the goods or services received by the user at the location.

The user computing devices 120 may be used by a user to create an information wallet account and interact with an entity computing system 105. The user computing devices 120 may include mobile devices such as a smart phone, portable gaming device, portable music listening device, portable digital or electronic viewing device, or another suitable wireless device. The user computing device 120 may comprise network interface logic, a display device, an input device, and an information wallet application 140. Network interface logic may include, for example, program logic that connects the user computing device 120 to the network. As described in greater detail below, for example, the user computing device 120 may display screens to prompt the user to review and/or approve data transfer requests, to request data from the user, etc. Such screens may also be used to prompt the user to specify parameters regarding the level of security to be associated with different elements of data regarding the user. For example, data requests including a mailing or physical address may be assigned a higher level of security than data requests involving an email address. Such screens are presented to the user via the display device. The display device may be interactive, for example touchscreen. An input device may be used to permit the user to initiate access to the information wallet and to facilitate sending/receiving requested information to/from the entities. In one embodiment, the input device may allow a user to access and redeem a gift stored in the information wallet system 100.

FIG. 1 shows information wallet computing system 115 disposed between the entity computing systems 105 and the user computing devices 120. In one embodiment, the information wallet computing system 115 is resides within a financial institution computing system. The information wallet computing system 115 may comprise program logic executable by and between the entity computing systems 105 and the user computing devices 120 to implement at least some of the functions described herein. As will be appreciated, the level of functionality that resides on the entity computing systems 105 or information wallet computing system 115 as opposed to the user computing devices 120 may vary depending on the implementation. The information wallet computing system 115 may include modules such as a business client system, business mobile system, and customer system. The business client system module may provide the backend support of the information wallet application disposed on a business client side. Likewise, the business mobile system and customer system modules may provide backend support of the information wallet application disposed on a business mobile device or a customer device. The information wallet computing system 115 may also host the cloud storage computing system 150.

The information wallet computing system 115 may allow the user computing devices 120 to interact with entity computing systems 105. In one embodiment, the information wallet computing system 115 facilitates the exchange of information between the user computing device 120 and the entity computing device 105. For example, the information wallet computing system 115 may receive information from a user computing device 120 and transfer that information to the entity computing system 105. In one embodiment, the information received from the user computing device 120 correspond with a request to the information wallet computing system 115 to retrieve certain information. The information wallet computing system 115 may receive the request, access the cloud storage computing system 150, retrieve the requested information, and forward the information as requested to the entity computing system 105. In another embodiment, the same process may apply for transferring information from an entity computing system 105 to the user. The information wallet computing system 115 may receive information from an entity computing system 105 and transfer that information to a user computing device 120. The information received may correspond with a request to the information wallet computing system 115 to retrieve certain information from the cloud storage computing system 150. The information wallet computing system 115 may receive the information including the request from the entity computing system 105, access the cloud storage computing system 150, retrieve the requested information, and transfer the information to the user computing device 120. For embodiments described throughout the disclosure, any user, customer, or entity may create an information wallet account through the information wallet system 100 using an available computing device.

The cloud storage computing system 150 may store information that is provided by the user, e.g., after the information wallet is enriched by one or more of the processes shown in FIG. 2, described below. The cloud storage computing system 150 may encrypt the data regarding the user. In some embodiments, the cloud storage computing system 150 may permit an entity to access the data based on a permission or security level granted by a user. For example, if a user configures an information wallet account to allow broad permission for sharing information about vehicles owned by the user, then an entity seeking the user's vehicle information may obtain that information without waiting for further approval. The entity may solicit the information from the cloud storage computing system 150 through the information wallet computing system 115, and the information wallet computing system 115 may retrieve the information based on pre-set permission by the user. The cloud storage computing system 150 may give the user full control of the information stored by the user in the cloud storage computing system 150. The system is configured such that an outside computing system may only access information in conformance with permission and security levels set by a user.

Some of the user information may be stored in the external entity storage systems 160 of entities 105. Accordingly, some data may be stored outside of the cloud storage computing system 150 and the user computing devices 120. In these situations, the information wallet computing system 115 may include a link out to the data stored in the external entity storage systems 160. The link out may be a token that is stored in the cloud storage computing system 150 or in the information wallet application 140 running on the user computing devices 120. The link out indicates to the information wallet system 100 the location and content of the information stored the external entity storage systems 160 of entities 105 such that the data can be integrated into the user's information wallet without having to store the data in the information wallet computing system 115. For example, a user may opt not to store medical information (e.g., an MM, X-rays, etc.) in the information wallet computing system 115, but rather in a records database of the user's medical provider. In this situation, the information wallet computing system 115 may be configured with a link out to the medical information stored in the records database of the medical provider such that that the information wallet system 100 has access to the externally stored data.

In an example embodiment, the information wallet system 100 allows interoperability between various entity computing systems 105 (e.g., external entity storage systems 160), information wallet computing systems 115, user computing devices 120, and other relevant systems. In order to provide the interoperability with each of the above listed systems, various adapters may be utilized on a plurality of systems. Adapters facilitate integrating computing systems of different technological platforms in a manner that allows different computing systems to connect with the information wallet system 100. The adapters may be implemented, for example, using plug-ins or Application Program Interfaces ("APIs"), which comprise a set of software components that add specific abilities to a larger software application. The plug-ins or APIs, in one embodiment, adapt the pre-existing enterprise computing system to connect with the information wallet system 100. The plug-ins or APIs may also enable the functionality of an application to be customized, such as an enterprise application that supports business operations of a business entity or an application (e.g., browser) executed on a user computing device 120. The application may be customized to meet any need or requirement of any particular entity, business, or customer using the information wallet system 100. For example, a hotel may have enterprise software with a plug-in installed that displays a button screen (i.e. "Request via Info Wallet") in the check-in screen. Upon the engaging the button, such as by pressing the button, the enterprise software may execute the plug-in. The plug-in may, for example, initiate the generation of a Bluetooth signal to establish Bluetooth contact with a user computing device 120. A random PIN may be verbally or textually communicated to the user for entry into the user computing device 120 in order to initiate Bluetooth pairing with the user computing device 120 of the user. The plug-in may therefore, via Bluetooth, request information from the information wallet system 100 of the user that is checking into the hotel. In other scenarios, the connection may be made by way of another type of wireless connection, such as but not limited to, Wi-Fi, WAN, 3G, 4G, NFC, etc. The plug-ins or other adapters may use a request/response protocol to communicate messages and execute code. The plug-ins or APIs may send messages in a predetermined format that contain a list of data that is requested. The user computing device 120 may receive the Bluetooth request and generate a screen requesting permission to send the requested information. The adapters may also request certain packages of data. For example, if a common adapter is developed that is used by various hotels using the same enterprise software, then all hotels may ask for the same package of data, and that information may be standardized and prepackaged to be sent each hotel. As will be appreciated, similar arrangements may be implemented in other contexts (e.g., healthcare providers, merchants, etc.).

The cloud storage computing system 150 may cooperate with the information wallet computing system 115 on the user computing device 120 to provide different levels of security to the information stored in the cloud storage computing system 115. For example, the user may configure the information wallet to provide the address and phone number of the user with a first (relatively low) level of security, to provide a credit card number of the user with a second (higher) level of security, to provide the credit card cvv value with a third (still higher) level of security, and to provide the user's social security with a fourth (even higher) level of security. As will be appreciated, any number of different levels of security may be provided. The level of security given to any particular data element may be determined as a matter of default (e.g., information wallet configuration may by default dictate that the user's social security number is given a higher level of security than the user's phone number), based on user-specified inputs (e.g., the user may be given the ability to set security on a data element by data element basis, to set security for groups of related data (e.g. health data vs. financial data), and/or to set security in another manner), etc. The level of security assigned to a specific type of information or data may alter the steps that must be taken in order for the information wallet system to relinquish the information to an outside computing system. For example, information and data with a relatively low level of security may be pre-approved for sharing by the user, and the information wallet computing system 115 may relinquish the information upon request by the entity. On the other hand, information or data assigned a higher level of security may require the information wallet computing system 115 to contact the user through the user computing device 120 and solicit authorization from the user. The authorization may be supplied by a number of ways, including, for example, an electronic signature, a pin number, a finger print, or direct user authorization through the user computing device 120. Security and/or validity of an information request is not exclusively "fixed." The informational wallet will have the capability to determine whether the "context of the transaction" is valid. Accordingly, if certain known patterns of fraud or trolling for information are detected the user may be alerted to the potential fraud or troll for data. Analytical models may be used to determine the probability of a valid or invalid data request.

As will also be appreciated, the security precautions taken in the context of a particular transaction may be determined not only based on the level of security associated with a particular information or data element, but also based on other factors, such as the identity of the entity requesting the information. For example, the user may configure the information wallet such that the user's spouse is granted access to all of the user's data, regardless of the level of security with which the data is associated. As another example, the information wallet may be configured such that the user's health care providers are given easier access to the user's health-related data, and the user's accountant is given easier access to the user's financial data. Hence, the user's approval may be prompted prior to the user's financial data being provided to the user's health care provider, but not prior to the user's financial data being provided to the user's accountant. Conversely, the user's approval may be prompted prior to the user's health-related data being provided to the user's accountant, but not prior to the user's health-related data being provided to the user's health care provider. As will be appreciated, the level of security provided may also be dependent on other factors, such as the time of day that the data is being requested (e.g., a request for data occurring in the middle of the night might be considered to be more likely to be fraudulent in some circumstances), the location of the requester (e.g., the IP address of the requester may indicate that the requester is overseas), the location of the user (e.g., the GPS signals from the user computing device 120 may indicate that the user is at a location that would not normally be associated with a request for health-related information), etc. As will be appreciated, heightened levels of security provided may also be provided in certain circumstances as a result of the operation of other fraud prevention algorithms (e.g., a pattern of requests for financial information may be identified as being unusual and therefore potentially fraudulent).

As discussed above, the action required to be taken by the user in order to approve such an information exchange may also be varied depending on the circumstances. For example, in some instances, approval may be passively granted based on the settings the user has set for their data (e.g., no affirmative action is required by the user to give the user's spouse access to the user's data). In other instances, affirmative action may be required to be taken on the part of the user. Again, the type of action may vary depending on the situation and the level of security to be provided. For example, in some instances, the approval may require the user to simply press a button labeled "approve" on the user computing device 120. In other instances, the approval may require the user entering a pin number or other secret password or code on the user computing device 120. As another example, biometric authentication, such as a body print, may be required. As will be appreciated, any number of different actions and different types of transactions may be required of a user in order to provide different levels of security in the context of particular information exchange transactions.

As will also be appreciated, in various embodiments, the information wallet system 100 may provide greater security than physical paper forms because the information is fully encrypted when exchanged and people do not have direct visual access to confidential data. The adapters on the entity computing systems 105 may provide an additional layer of protection by enforcing security settings of the information wallet computing system 115. In various embodiments, the information wallet system 100 may also provide enhanced security by providing an easier alternative to manually managing large amounts of password and authentication data. A user who is required to have a plurality of usernames and passwords for different accounts may feel compelled to catalog the plurality of passwords and associated websites on a hard copy for easy access. For example, a user may write down a list of passwords and keep the passwords within reach for easy reference, thereby impairing the security of the sensitive information. In one embodiment, after using the information wallet for over a period of time, the user may no longer have to remember a plurality of passwords for a plurality of websites or entities, etc. The user may self-authenticate using a combination of the identity of the device, biometric information acquired from the user by the user computing device 120, a single unified pin/password, or other identification methods.

In some embodiments, digital signatures may be used to certify the entity, the customer, the user, or the data. For example, driver's licenses typically contain information such as the date of birth, name, address, eye color, height, weight, donor status, etc., of the holder of the driver's license. Assuming data for the driver's license is obtained from an official government department, such as the department of motor vehicles for the state issuing the driver's license, the driver's license data may be digitally signed by the department of motor vehicles using standard certification technology. Hence, when this data is communicated to another entity computing system 105, the digital signature may be communicated with the data to certify that the data is accurate. Additionally, biometric information received from governmental authorities may be used to certify an entity, the customer, the user, or the data. For example, people are often required to submit to a background check for certain employment, which often requires going to a police station to obtain a set of fingerprints. The data collected at the police station may be used for certification and self-authentication purposes.

FIG. 2 is a diagram showing various ways in which the information wallet account (through an information wallet application 140) may be enriched with data. For example, data may be entered manually by the user via a keyboard or other suitable device. The user may enter information including a name, address, phone number, contacts, calendar, and other information. Also, image data may be received via a scanner, wherein scanned information may include, for example, a birth certificate, license, diploma, etc. Data may be received from smart devices such as cars, alarm clock, medical device, appliances, watches, phones, tablets, etc. and any application running on these devices Biometric information may also be received, such as voiceprint, fingerprint, palm print, facial recognition information, etc. In some embodiments, the biometric information may be digitally signed either by a government agency, the entity that provides the cloud storage computing system 150 (e.g., a bank), or other trusted authority. In such embodiments, the information may then be used for biometric authentication. The data received from the smart devices may be stored. The data may be stored in a database. The data may be stored in standard predefined fields of the database or may be stored in customized fields as defined by the storing entity (e.g., in fields created by augmenting standard predefined fields). The data stored may be augmented with additional data or deleted. Stored data may be include metadata such as a time stamp or a version number. Data may be permanently stored unless a delete command is received from the user.

Data may be additionally received as an encrypted payload over email, USB drive, wired or wireless Internet, and so on. The encryption allows the information to be transferred safely without being accessed from an unauthorized party. The information wallet account may also receive information from the context of a transaction with a merchant or entity. This may include purchase transaction information of any type, including the price of an item, the selection of a gift, additional warranty information, receipt information, etc. The information wallet application 140 may download data from online sources, such as online account information, telephone information, invoices, etc. The data from these and other sources may be used to enrich the information wallet and later made accessible to the entity computing systems 105 via the user computing devices 120.

FIG. 3 is a schematic diagram showing how the data collected in FIG. 2 can be published to various entities. As shown in FIG. 3, a user may share information with government entities, merchants, healthcare providers, employer, friends/family, and others. This information may be shared according to permissive authorizations and security levels as discussed above. FIG. 3 depicts the passive delivery of data wherein the user has configured data to publish to entities automatically, so that the user does not need to remember to publish the data. For example, if the user has a change of address, the updated address may be automatically transmitted to friends/family, employers, health care providers, merchants, the government, financial institutions, and so on. While FIG. 3 shows automatic sending of data (publishing), as will be appreciated, the information wallet system 100 may also be used for automatically receiving data (subscribing). For example, the user may subscribe to automatically receive data or messages regarding specific content from a specific entity computing systems 105. While some information may be configured to publish and subscribe automatically, other information may be configured to block automatically. For instance, the system may be configured to prevent publishing information to specific entities (i.e. credit card companies) or to block automatic subscriptions to certain entity publications (i.e. weekly e-newsletters).

Figure 4:
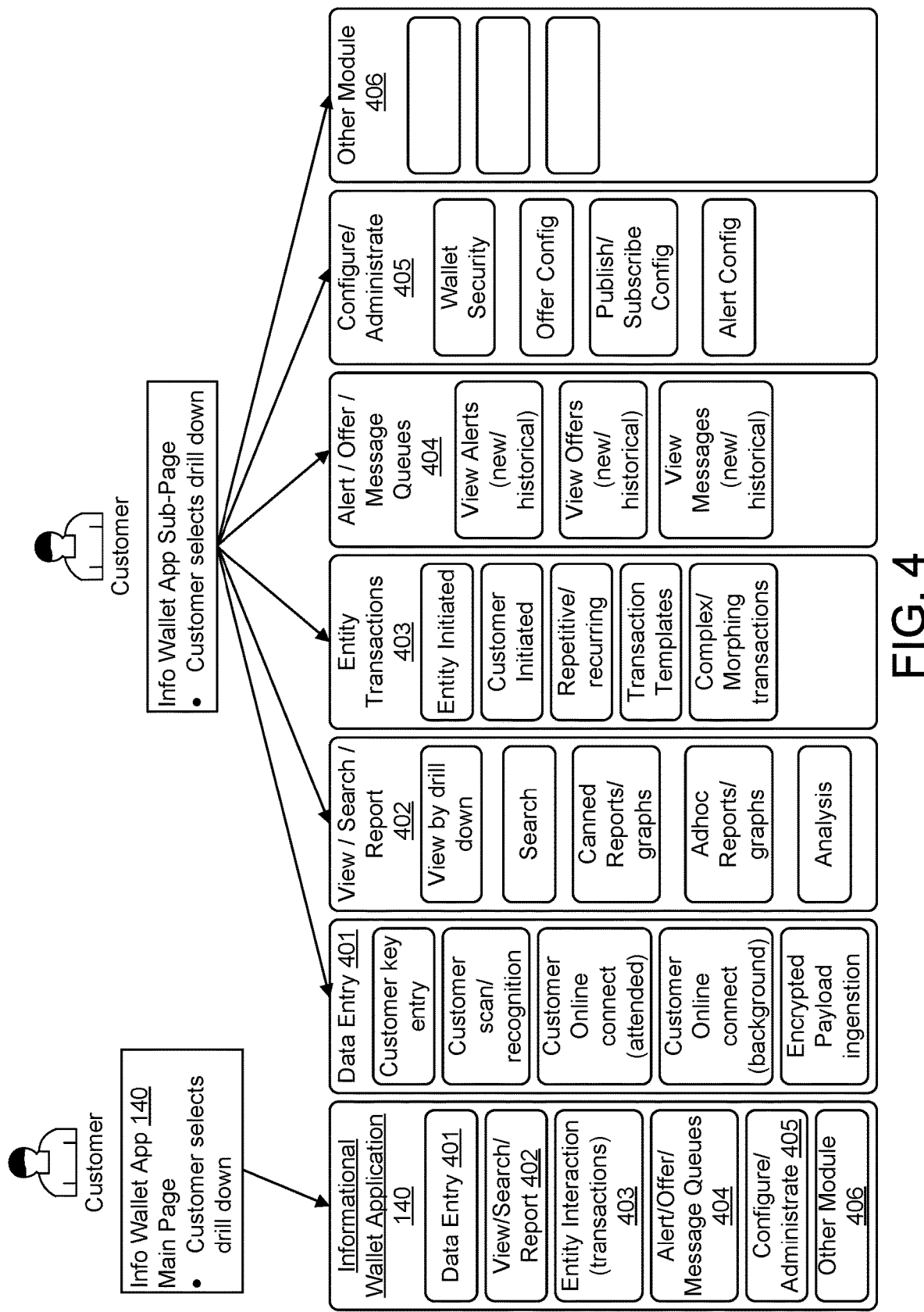
FIG. 4 is a schematic diagram of a computer-implemented information processing system from FIG. 1 according to an example embodiment.

FIG. 4 is a schematic diagram showing tools provided to the user via a user information wallet application 140 operating on the user computing device 120 according to an exemplary embodiment. The tools shown in FIG. 4 provide the user with different ways of entering, updating, accessing and analyzing their data stored in the cloud storage computing system 150. As shown in FIG. 4, by way of a top-level menu level of the information wallet application 140, the user may be provided with data entry tools 401, view/search/report tools 402, entity interaction tools 403, alert/offer/message queue tools 404, configure/administrate tools 405, and other module tools 406. As shown in FIG. 4, by selecting one of the top-level menu items, the user may be taken to a drill down menu that provides further options. In one embodiment, the data entry tools 401 allow a user to enter information into the information wallet system 100 through the user computing device 120. The data may be gathered by typing information into a screen or by capturing the information via other methods, including but not limited to capturing images, a vocal recording, a video recording, etc. The data entry tool 401 may have a drill down menu that provides more functions for the application. In one embodiment, the data entry tool 401 drill down menu includes modules such as customer key entry, customer scan/recognition, customer online connect (attended) customer online connect (background), and encrypted payload module. Customer key entry and scan/recognition modules support the data and information gathering functions discussed above. The customer online connect modules, both attended and background, facilitate the functions of gathering the data and information from the customer and transferring the data and information to the cloud storage computing system 150. The encrypted payload module serves to encrypt the data prior to transferring the data from the user computing device 120 to the cloud storage computing system 150 of the information wallet computing system 115. Any of the modules and functional units discussed above or below may contain logic executable by a processor to achieve the described functions.

The view/search/report tool 402 may allow the customer or user to view, search, and retrieve information from the information wallet application 140. For example, a customer may want to view specific information that the customer previously entered into the system through the data entry tool 401. To retrieve the information, the customer may use the view/search/report tool 402 module to enter certain parameters. The backend portion of the information wallet application 140 may retrieve the data from the cloud storage computing system 150 according to the parameters entered by the customer and deliver the information to the user computing device 120. In one embodiment, the view/search/report tool 402 drill down menu includes modules such as view by drill down, search, canned reports/graphs, adhoc reports/graphs, and analysis. These modules allow functions described above to occur, such as searching for information using certain parameters. The view by drill down menu may allow any information that the customer desires to view to be displayed in a list, which further displays related information upon engaging the list. The modules also allow the information to be presented in an organized, useful manner through avenues including graphs and reports. The information, data, reports, and graphs may be used for any type of analysis or metric functions. The analysis module may support functions such as retrieving a list of data, retrieving details behind the data, listing aspects of the data with accompanying relevant information, and so on. Analytics that may be performed may include numerical calculations, metric evaluation, a summary or analysis of numeric data (such analysis including mean, average, standard deviation, percentages, comparison, likelihood), cost projections, and so on. The user can also install applications (commonly called "apps") that specifically provide reporting and/or analysis to the user based on data in the informational wallet. For example, an application may correlate, driving habits, eating habits, and sleeping habits to health data (e.g., heart rate, blood pressure, oxygen saturation, etc.).

The entity transaction tool 403 allows the customer information wallet to interact with an entity through the information wallet system 100. In one embodiment, the entity transaction tool 403 drill down menu may include modules such as entity initiated, customer initiated, repetitive/recurring, transaction templates, and complex/morphing transactions. Through these modules, the customer may control how the customer interacts with the entity and how the entity is allowed to interact with the customer through the information wallet system 100. The entity initiated module allows a customer to control how entities initiate information requests or information transfers. The customer initiated module allows a customer to determine the manner in which it initiates transactions with an entity. For example, a customer may configure the information wallet application to solicit coupons for savings from specific entities. The repetitive/recurring module allows the customer to exact control on the interactions with the entities through the information wallet system 100 according to a specified period. For example, a customer may give recurring orders through the repetitive/recurring module (e.g. ordering medication every month). The transaction template module allows a customer to set a template on how information should be handled such that the transaction may easily occur in the future. Different entities may also have transaction templates, which could be transferred to the user computing device 120 and stored for easy use. The complex/morphing transactions facilitate transactions that are more complex than straight-forward transactions and change over time. These difficult transactions may involve greater manipulation and monitoring, and the complex/morphing transactions modules help facilitated those functions. The user may be able to write rules that govern these complex transactions. For example, the user may specify a rule that indicates that the user is to be prompted to order medication if blood pressure went over a certain threshold within the month.

In one embodiment, the alert/offer/message queues tool 404 includes a drill down menu with modules including view alerts, view offers, and view messages. These modules assists in displaying alerts from activities, offers from entities, or messages from any computing system connected with the information wallet system. The displays, offers, or messages may be new or historical. In one embodiment, the configure/administrate tool 405 contains a drill down menu with modules such as wallet security, offer configuration, publish/subscribe configuration, and alert configuration. The wallet security module controls the security of the wallet. A customer may engage this module to edit the security settings of the wallet and of information shared from the wallet. For example, the security level for certain information may be assigned using the wallet security module. The offer configuration module allows a customer to control which offers it receives from entities. This module supports the function of blocking or allowing offers received by the information wallet. The publish/subscribe configuration controls the manner in which information from the customer's information wallet account may be shared with other entity computing systems 105. Any of the modules discussed throughout the disclosure may communicate or interact with other modules in order to fulfill the required functions. For example, the publish/subscribe configuration module may interact with the wallet security module to determine what information to publish and to which entity. In one embodiment, the publish/subscribe configuration module determines the information's level of security as set in the wallet security module, then publishes the information according to the assigned security level. If information is set at a high level of security and requires a pin and thumbprint to publish, then the publish/subscribe configuration module may communicate with the wallet security module to enforce the pin and thumbprint requirement prior to publishing the information. The alert configuration modules allow a user to control when alerts may be given by the system. For example, a user may use the alert configuration module to set up an alert each time a user's social security number is solicited or shared. Other module tools 406 represent a plurality of modules that may facilitate the implementation of any desired function of the information wallet system.

FIG. 5 is a diagram showing information synchronization between various information wallet (IW) adapters 505 and user applications. Various adapters 505 may be developed to promote easy integration with business applications and systems, user devices, legacy systems, and so on. The adapters 505 may be used to enforce common data protocols and schemas. The adapters 505 may also be used to synchronize information traveling between, for example, entity computing systems 105 and the information wallet application 140 on a user computing device 120. As indicated in FIG. 5, different adapters 505 may be developed for different industries and tailored to meet specific industry needs. Adapters 505 may be developed for different software applications used by different types of businesses. Different data schemas may be developed for different domains (e.g., different industries). Again, the adapters within a common domain (e.g., healthcare) may use the same schemas to promote common data protocols and schemas. In various embodiments, the adapters may utilize both standard and non-standard schemas. For example, an entity may be permitted to add, change, and/or delete any data element with the approval of the user. Those data elements can be standard data elements within a domain or custom elements within a domain. In addition, an entity may be permitted to add a custom extension to an existing data element that is either standard or custom. In all cases, the adds, changes, and/or deletes may be versioned and saved such that the full data picture is preserved. In some situations, destructive deletes may be permitted with the approval of the user or at the request of the user. Adapters 505 may also enforce security standards of the computing systems and information transferring between the computing systems of the information wallet system 100.

Figure 6:
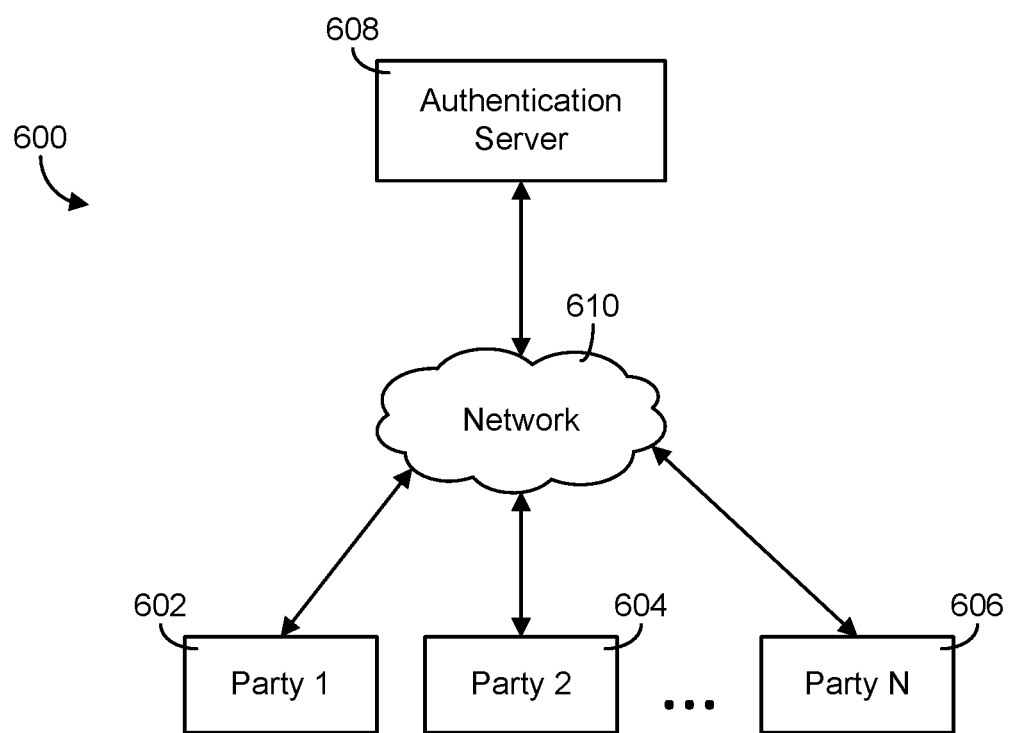
FIG. 6 is a schematic diagram of an authentication system according to an exemplary embodiment.

Referring to FIG. 6, a schematic diagram of an authentication system 600 is shown according to an exemplary embodiment. System 600 may utilize the above described systems and methods associated with the information wallet system to authenticate a plurality of users. System 600 includes at least two parties (a first party 602 and a second party 604). System 600 may include any number of parties (the first party 602, the second party 604, . . . , the nth party 606). Each party may be an individual person, a group of people, a business, a government entity, or the like. Each party may be a user of the information wallet. Thus, each party may have access to the information wallet infrastructure described above with respect to FIGS. 1-5.

System 600 includes an authentication server 608. The authentication server 608 may include memory, a processor, and a network interface. The authentication server 608 may be part of the information wallet computing system 115. Accordingly, the authentication server 608 may be hosted by the institution that provides the above described information wallet. For example, the authentication server 608 may be hosted by a financial institution as part of its information wallet service. In other arrangements, the authentication server 608 may be a separate server in communication with the information wallet system 115. In either case, the authentication server 608 communicates with the parties through the network interface via a network 610. In the case where the authentication server 608 is a separate entity than the entity providing the information wallet, the authentication server 608 also may communicate with the information wallet entity through the network 610. The network 610 may be a local area network (e.g., an intranet) or a wide area network (e.g., the Internet). The network 610 may include wired network components and/or wireless network components.

The authentication server 608 is configured to authenticate any parties 602, 604, 606 of system 600 that are involved in a transaction. The transaction may require party authentication prior to completion of the transaction. The authentication may automatically take place in response to a pending transaction between at least two users. Alternatively, the authentication may be independent of any pending transactions between users. The authentication may relate to a confirmation of an identity of a first party (e.g., first party 602) to a second party (e.g., second party 602) and/or a confirmation of a transaction between the two parties (e.g., the parties' intents to enter into the specified transaction). The authentication server 608 communicates authentication information and data with the plurality of parties via the network 610 and/or via information wallet clients (e.g., a website, a computer program, a smartphone application, a tablet computer application, etc.) accessible by the parties involved in the transaction via user computing devices 120.

Parties 602, 604, 606 may access the authentication system 600 and the authentication server 608 through information wallet system 115 applications running on user computing devices 120 associated with the parties. Parties 602, 604, 606 may be authenticated through biometric information, personal information about the parties 602, 604, 606, information about the pending transaction, or a combination thereof, which may be stored in the information wallet system 115. Authentication server 608 may authenticate parties 602, 604, 606 after receiving biometric information, such as picture, facial recognition data, voice signatures, handwriting samples, fingerprints, retina scans, etc., and cross-referencing the received biometric information with verified biometric information stored in the information wallet system 115. Authentication server 608 may authenticate parties 602, 604, 606 by requesting input of personal information (e.g., store the name of a party's first pet, mother's maiden name, social security number, or the like) and cross-referencing the received personal information with verified personal information stored in the information wallet system 115.

As described in further detail below with respect to FIG. 7, upon a transaction (e.g., a purchase, a line of credit request, a barter, a donation, a gift, etc.), a first party involved in the transaction may request that the information wallet system 115 authenticate that the second party involved in the transaction is indeed the person or entity they claim to be. The authentication server 608 may then request verification of the second party via the information wallet system 115 (e.g., via a user computing device 120 of the second party). The requested authorization information of the second party may depend on a level of the transaction. For example, a simple yes/no request may be sent to the second party for a purchase having a cost of less than $1,000, while a purchase of $1,000 or more may require the provision of biometric information. The second party may be able to set the various value thresholds for the different levels. The information wallet system 115, through the authentication server 608, may then contact the second party to verify that he is attempting to make the transaction. Through the information wallet, the second party verifies that he is attempting to make the transaction by providing the requested personal information and/or biometric information. The information wallet system 115 then authenticates the provided information, and supplies an authorization response to the first party involved in the transaction. Alternatively, the second party may receive the authentication request and indicate that the transaction activity is fraudulent. In such a situation, the information wallet system 115 may indicate the fraudulent activity to the first party in the transaction.

The authentication may be provided as a service to the parties. The authentication service may be limited to registered users of the information wallet system 115. The authentication service may require a fee from any of parties 602, 604, 404. The fee may be a flat fee, a percentage of the transaction amount (e.g., a percentage of the total sale), or some other fee amount for guaranteeing the authenticity of the purchaser. In various implementations, the risk associated with an erroneous authentication may be retained by the dealer or may shift (i.e., in exchange for a higher fee).

Figure 7:
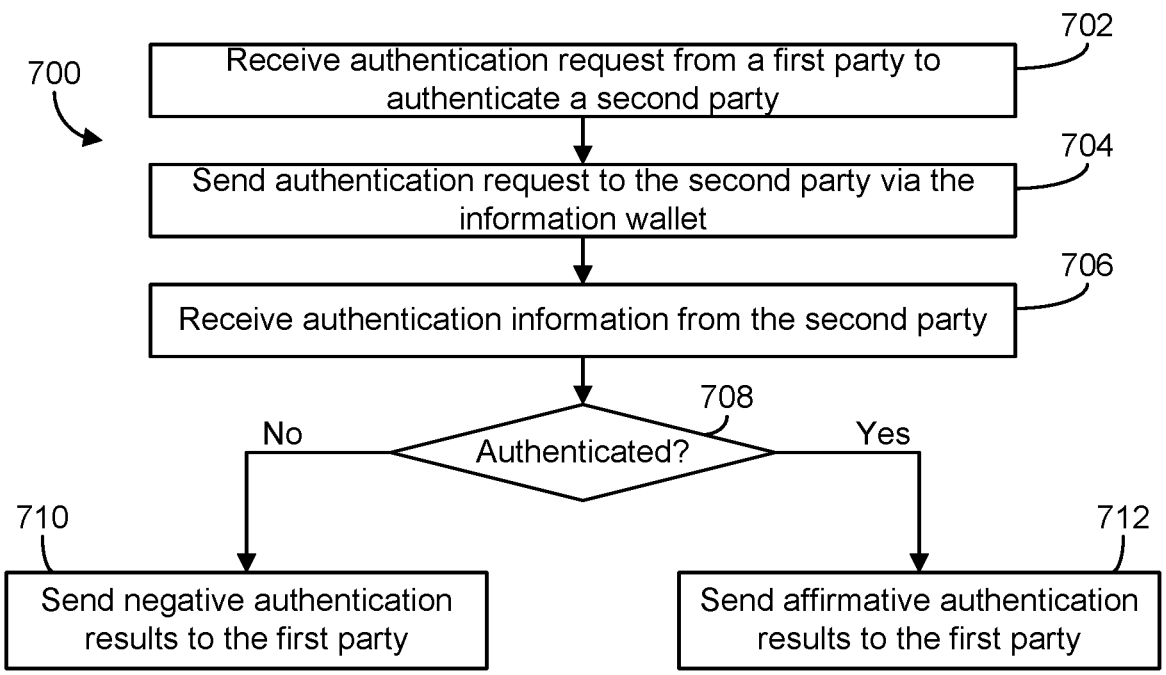
FIG. 7 is a flow diagram of a method of authenticating parties in a transaction according to an exemplary embodiment.

Referring to FIG. 7, a flow diagram of a method 700 of authenticating parties in a transaction is shown according to an exemplary embodiment. The method may be performed by a controller or a processor of a party authentication system (e.g., authentication server 608 of system 600). The authentication system may be part of an information wallet system (e.g., information wallet system 115).

Method 700 begins when the authentication system receives an authentication request from a first party to authenticate a second party at 702. Each party may be an individual person, a group of people, a business, a government entity, or the like. The authentication request initiated by the first party may be to verify an identity of the second party. The authentication request may be to verify the second party's intent to enter into a transaction with the first party. The authentication request may include information about the transaction (e.g., price, good type, service type, location of the transaction, other involved parties, etc.). In some arrangements, the request may be initiated automatically upon a detected transaction (e.g., upon the detection of a credit card transaction, a credit request, a bank transfer, etc.). For example, when the authentication system detects a line of credit request or a payment request, a request for authentication of the involved parties may be initiated automatically by the authentication system.

The authentication system sends an authentication request to the second party at 704. The authentication request may be sent to the second party via the information wallet system. A notification may be sent to the second party to alert the second party of the pending authentication request. The notification may be a text message, an e-mail message, a push notification, a telephone call, or a combination thereof. The notification may include a message requesting that the user log into the information wallet system to respond to the authentication request. For example, the notification relating to the authorization request may state "The Authentication Service has received a request to verify your identity and transaction details. Please log into your information wallet to provide the requested information." The authentication requests may include a request to verify that the second party is attempting to enter a transaction with the first party. The authentication request may include a request to provide information, such as personal information and/or biometric information, in responding to the authentication request. The type and amount of information requested from the second party may depend on a level of the transaction. For example, a simple yes/no request may be sent to the user for a purchase having a cost of less than $1,000, while a purchase of $1,000 or more may require the provision of biometric information. The user may be able to set the threshold values for the various tiers of authentication requirements in their information wallet system account. There may be any number of tiers, including one, two, or more than two.

The authentication system receives authentication information from the second party at 706. As discussed above, the type and amount of information may vary depending on the type of transaction causing the authentication request. The received information may relate to a simple yes or no from the second party. The received information may include personal information (e.g., in response to a question posed in the authentication request, such as "What is your mother's maiden name?"), biometric information (e.g., picture data, facial recognition data, voice signatures, handwriting samples, fingerprints, retina scans, etc.), information regarding the transaction, or a combination thereof. The received information may include an indication that the transaction is a fraudulent transaction.

The authentication system determines whether the second party has provided the necessary authentication information at 708. The authentication system does so by analyzing the information received from the second party. The authentication system may compare received information with verified information stored in the second party's information wallet system account. For example, the authentication system may verify and/or authenticate the second party by cross-referencing received biometric or personal information with verified biometric or personal information stored in the information wallet system. If the provided information matches the stored and verified information in the information wallet, the second party's identity may be authenticated. Additionally, the authentication system may analyze any transaction-specific information provided by the second party. For example, the authentication system may analyze information relating to whether the second party has the intent to enter the transaction with the first party or whether the transaction is a fraudulent transaction. If the second party is determined to not be authenticated at 708 (e.g., the provided information does not match or the transaction is indicated as fraudulent), the authentication system sends a negative authentication to the first party at 710. The negative results may indicate to the first party that the second party is not who the second party purports to be and/or that the transaction may be fraudulent. The negative results may recommend that the first party void or cancel the pending transaction. If the second party is determined to be authenticated at 708, the authentication system sends an affirmative authentication to the first party at 712. The affirmative authentication may include a degree of certainty based on the amount of authentication information provided by the first party.

The above method may be repeated for all parties involved in a single transaction. For example, a transaction may involve cross-authentication of two or more parties, in which more than one authentication is needed. The above method may be used to authenticate both an identity of a party as well as an intention of the party to enter the transaction.

Figure 8:
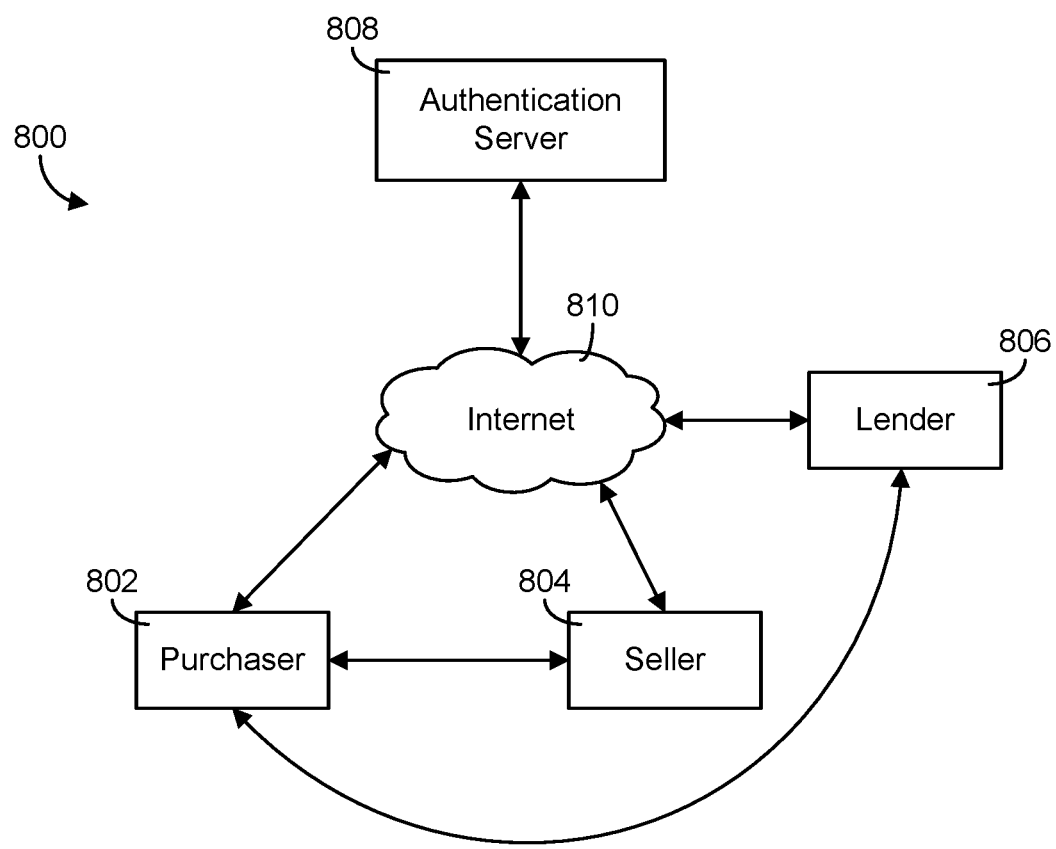
FIG. 8 is a schematic diagram of an authentication system for a financed three-party transaction according to an exemplary embodiment.
Figure 9:
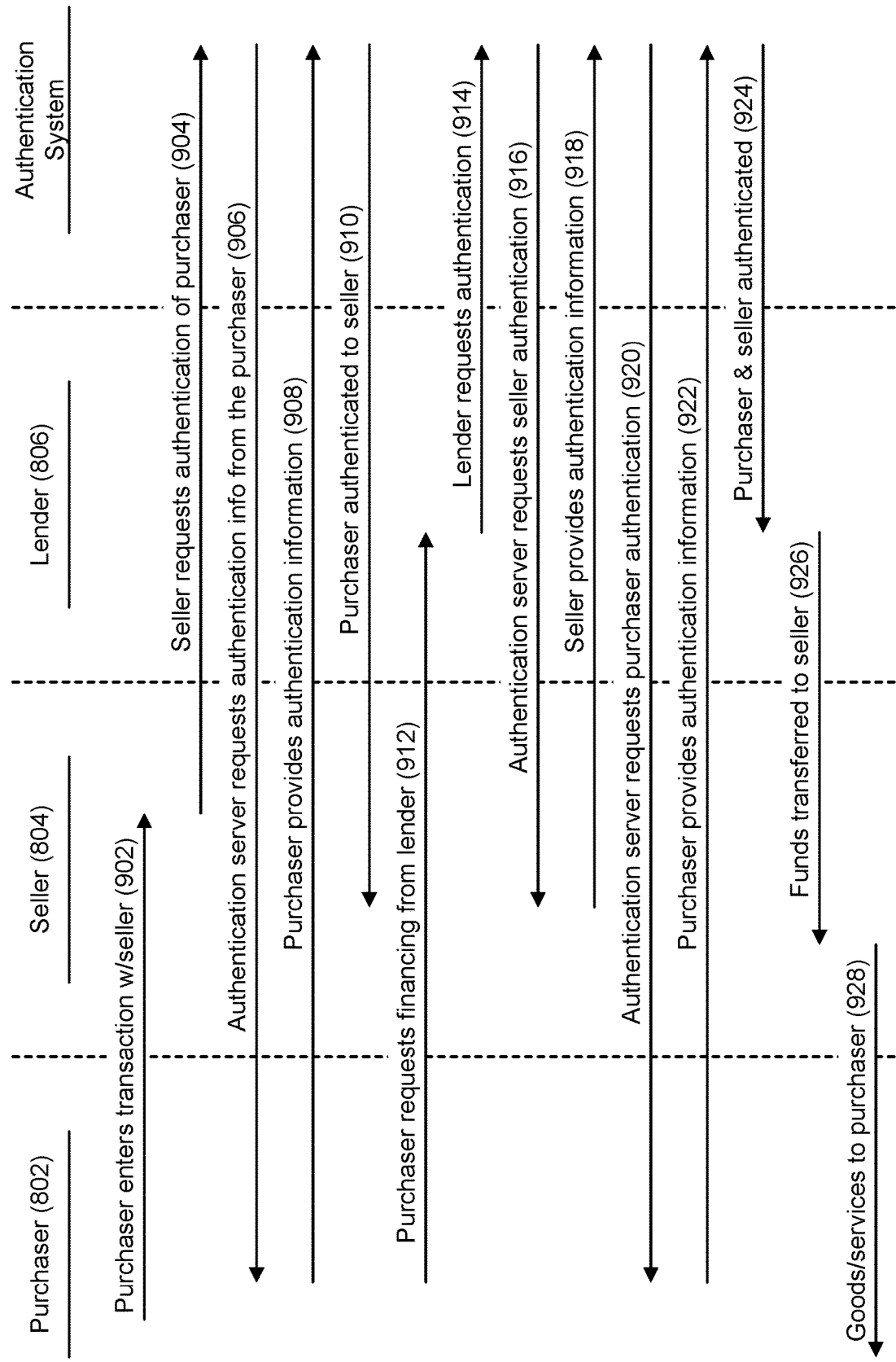
FIG. 9 is a flow diagram of the method of the financed three-party transaction of FIG. 8 according to an exemplary embodiment.

Referring to FIGS. 8 and 9, an exemplary three-party authenticated transaction is described according to an exemplary embodiment. As shown in FIG. 8, an exemplary authentication system 800 for authenticating a financed three-party transaction is shown according to an exemplary embodiment. System 800 may be similar to system 600 as described above with respect to FIG. 6. In system 800, a purchaser 802 is purchasing a good or service from a seller 804. For example, the purchaser 802 may be purchasing a car from a car dealer (seller 804). The purchaser 802 is financing the purchase from a lender 806. The lender 806 may provide payment directly to the seller 804. Accordingly, three parties—the purchaser 802, the seller 804, and the lender 806—are involved in the present transaction. As described in further detail below with respect to FIG. 9, multiple authentications may be needed in order for the transaction to be completed.

System 800 includes an authentication server 808. The authentication server 808 may include memory, a processor, and a network interface. The authentication server 808 is similar to authentication server 608 of FIG. 6. Accordingly, the authentication server 808 may be part of the information wallet system 115 or may be in communication with the information wallet system 115. In either case, the authentication server 808 communicates authentication information with the purchaser 802, the seller 804, and the lender 806 through the network interface via the Internet 810. In the case where the authentication server 808 is a separate entity than the entity providing the information wallet, the authentication server 808 also communicates with the information wallet entity through the Internet 810. Although the network used to facilitate the communication is shown as the Internet 810, the network may instead be a local area network (e.g., an intranet) or a different wide area network.

Similar to authentication server 608 of system 600, the authentication server 808 is configured to authenticate the parties involved in the purchase transaction to requesting parties. The authentication may be triggered automatically upon the detected pending transaction between the purchaser 802 and the seller 806 and/or upon the financing agreement between the purchaser 802 and the lender 806. Alternatively, the authentication may be triggered manually by any of the involved parties. The authentication may relate to a confirmation of an identity of any of the involved parties, a confirmation of transaction details between the parties, and/or a confirmation of the parties' intents to consummate the transaction. The authentication server 808 may communicate authentication information and data with the parties via the information wallet.

Referring to FIG. 9, a flow diagram of the financed three-party transaction sequence of events showing the various communications between the parties (purchaser 802, seller 804, and lender 806) and the authentication server 808 is shown according to an exemplary embodiment. For the sake of clarity, the reference numerals 800-808 are omitted from the discussion of FIG. 9.

The purchaser enters a transaction with the purchaser at 902. For example, the purchaser may be an individual attempting to purchaser a car from the seller, a car dealership. In the example, the purchaser may agree to purchase a specific car for a specific price. The seller wants to verify that the purchaser is the person they claim to be, and not an imposter. Accordingly, the seller requests authentication of the purchaser from the authentication system at 904. The request may be made through an information wallet application (e.g., a website, a native application, etc.) accessed through a user computing device of the seller. For example, the request may be made from an information wallet system account associated with the seller and provided directly to the authentication system, which may be integrated into the information wallet system or a separate system. The request from the seller may include purported identifying information of the purchaser (e.g., a name, a home address, a telephone number, a user ID, a driver's license number, a social security number, etc.). Additionally, the request from the seller may include information relating to the transaction (e.g., the identity of the goods or services being purchased, the price of the goods or services, etc.). Both of which may be authenticated via the authentication system After receiving the authentication request from the seller, the authentication system requests authentication information from the purchaser at 906. The authentication information may be requested from the purchaser through the information wallet application. The authentication information requested may vary based on user preferences (the seller's preferences, the purchaser's preferences, etc.) and/or the provided information relating to the transaction. The authentication information may vary in order to provide a higher degree of certainty of authentication ("a higher level of authentication") for certain items, such as expensive items, and a lesser degree of certainty of authentication ("a lower level of authentication") required to authenticate other items, such as inexpensive items. For example, the higher level of authentication may be required for purchases above a cost threshold (e.g., for purchases of $1,000 or greater) while the lower level of authentication is used for purchases below the cost threshold (e.g., purchases for less than $1,000). The threshold cost level may be set automatically by the information wallet, may be set based on a transaction history of the purchaser (e.g., if the purchaser routinely purchases an expensive item), and/or user settings (the seller's preferences, the purchaser's preferences, etc.). The information wallet authentication system may include more than two authentication levels. For example, the information wallet authentication system may include three or more authentication levels, with each step between the levels set at a different threshold cost.

Each authentication level may require a different set of authentication information from the user to authenticate the user and/or the transaction. For example, the lower level of authentication may require the user just to verify a pin or password upon receiving a request, while the higher level of authentication may require that the user verify a PIN or password and provide a biometric (e.g., a fingerprint, a voice sample, a picture via a user computing device camera, etc.) The user may provide the requested authentication information through the information wallet application running on a user computing device. The requested authentication information may be requested on a single user interface of the information wallet application. Alternatively, the authentication information may be requested in a series of questions in a series of steps. For example, a first user interface of the information wallet application may request that the user verify a PIN, a second user interface of the information wallet may ask the purchaser to verify that he is attempting to purchase the good or service from the seller, and a third user interface of the information wallet application may ask the purchaser to provide a biometric, such as a picture that may be used by the authentication system for facial verification of the purchaser's identity.

The purchaser provides authentication information to the authentication system at 908 via the information wallet application. The provided information may include a PIN, a password, a user ID, a social security number, an answer to a security question, an answer to a question about the transaction, biometric information, other information, or a combination thereof. Depending on the information provided by the purchaser, the authentication system authenticates the purchaser to the seller at 910. The authentication system may cross-reference the provided information with verified information relating to the purchaser stored in the purchaser's information wallet system account and/or with information relating to the transaction provided by the seller in the authentication request. If the provided information matches the information on file with the authentication system, the purchaser may be authenticated. In situations where the information provided by the purchaser does not match, the authentication system may communicate a negative authentication to the seller. Additionally, the purchaser may have the ability to report the transaction as fraudulent activity, and the authentication system may alert the seller, a government authority, a financial institution, a law enforcement agency, or another third party of the fraudulent activity.

After the purchaser is authenticated, the purchaser may request financing from the lender at 912 in order to pay for the goods or services from the seller. For example, continuing with the car sale example, the purchaser may not have the necessary funds to complete the transaction without relying on a third-party lender. Prior to handing over funds to either the purchaser or the seller, the lender may want to verify the transaction. The lender may want to verify the identity of the purchaser, the intent of the purchaser to enter into the transaction with the seller, the intent of the purchaser to enter into the transaction with the lender, the identity of the seller, the intent of the seller to enter into the transaction with the purchaser, and details about the transaction itself (e.g., what is being purchased, the cost of the purchased good or service, any security interests involved with the good or service, etc.). Accordingly, the lender may request authentication of the seller and of the purchaser at 914.

The authentication system requests authentication information from the seller at 916, and the seller provides authentication information to the authentication system at 918. Additionally, the authentication system requests authentication information from the purchaser at 920, and the purchaser provides authentication information to the authentication system at 922. The authentication requests and responses are made in the same manner as described above with respect to steps 906 and 908. Although the above transaction discloses the lender authenticating the seller prior to authenticating the purchaser, the order may be irrelevant in the scheme of the transaction from the perspective of the lender. Accordingly, the authentication system may be configured to simultaneously request authentication information from both parties or to request authentication information from the purchaser prior to requesting authentication information from the seller. After receiving the authentication information from the purchaser and the seller, the purchaser and seller are authenticated to the lender by the authentication system at 924 in the same manner as discussed above with respect to step 910.

Upon receiving the authentications, the lender may transfer funds to the seller at 926 for the purchase of the goods. The goods and/or services are provided from the seller to the purchaser at 928. In effect, step 928 completes the authenticated, three-party transaction.

The above systems and methods may be used for authentication and cross-authentication of any number of parties involved in any number of transactions. Additionally, the above systems and methods may be used to provide authentication of individuals and/or entities independent of any pending transactions between the individuals and/or entities.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the designing of the operating conditions and arrangement of the embodiments without departing from the scope of the present invention.

What is claimed is:

1. A non-transitory computer-readable medium having computer-executable instructions encoded thereon which, when executed by one or more processors, cause the one or more processors to perform operations comprising:

receiving, from a first seller device, using a network interface in communication with the one or more processors, via a communication network, a first authentication request to authenticate information of a buyer for a first transaction, the first authentication request comprising a first seller device location and a first transaction value;

based on a comparison of the first transaction value to a lower level transaction threshold, and based on the first seller device location, determining, using the processor, that a lower level of authentication is required for the first transaction;

in response to determining that the lower level of authentication is required for the first transaction, transmitting, to a client application at a buyer device of the buyer, using the network interface in communication with the one or more processors, via the communication network, a first information request for a first set of one or more user inputs via a first user interface, the first set of one or more user inputs comprising at least an alphanumeric entry;

receiving, from the buyer device responsive to the first information request, using the network interface in communication with the one or more processors, via the communication network, an alphanumeric user input provided to the first user interface of the client application; authenticating, using the processor, the alphanumeric user input from the buyer device by comparing the alphanumeric user input with information stored in an account of the buyer to verify the alphanumeric user input is associated with the buyer;

in response to authenticating the alphanumeric user input, transmitting, to the first seller device, using the network interface in communication with the one or more processors, via the communication network, a first authentication message comprising an indication the buyer is authenticated for the first transaction;

receiving, from a second seller device of the second seller, using the network interface in communication with the one or more processors, via the communication network, a second authentication request to authenticate information of the buyer for a second transaction, the second authentication request comprising a second transaction location and a second transaction value;

based on the second transaction location and a comparison of the second transaction value to a higher level transaction threshold, determining, using the processor, that a higher level of authentication is required for the second transaction;

in response to determining that the higher level of authentication is required, transmitting, to the client application at the buyer device, using the network interface in communication with the one or more processors, via the communication network, a second information request for a second set of user inputs via a plurality of user interfaces, the second set of user inputs comprising at least a biometric user input, each of the plurality of user interfaces accepting one of a second alphanumeric input and the biometric user input;

receiving, from the buyer device responsive to the second information request, using the network interface in communication with the one or more processors, via the communication network, the second alphanumeric input and the biometric user input;

authenticating, using the processor, the second alphanumeric input and the biometric user input received from the client application at the buyer device by comparing the biometric user input and the second alphanumeric input with digitally signed biometric information and second information stored in the account of the buyer, respectively, to verify that the biometric user input and the second alphanumeric input are associated with the buyer; and in response to authenticating the biometric user input and the second alphanumeric input, transmitting, to the second seller device, using the network interface in communication with the one or more processors, via the communication network, a second authentication message comprising an indication the buyer is authenticated for the second transaction.

2. The non-transitory computer-readable medium of claim 1, wherein the computer-executable instructions, when executed by the one or more processors, cause the one or more processors to perform further operations comprising requesting, as the biometric user input, a picture taken by a camera.

3. The non-transitory computer-readable medium of claim 1, wherein the computer-executable instructions, when executed by the one or more processors, cause the one or more processors to perform further operations comprising requesting fingerprint data as the biometric user input.

4. The non-transitory computer-readable medium of claim 1, wherein the computer-executable instructions, when executed by the one or more processors, cause the one or more processors to perform further operations comprising requesting facial recognition data as the biometric user input.

5. The non-transitory computer-readable medium of claim 1, wherein the computer-executable instructions, when executed by the one or more processors, cause the one or more processors to perform further operations comprising requesting a voice sample as the biometric user input.

6. The non-transitory computer-readable medium of claim 1, wherein the computer-executable instructions, when executed by the one or more processors, cause the one or more processors to perform further operations comprising requesting, as the alphanumeric entry, a password or a personal identification number (PIN).

7. The non-transitory computer-readable medium of claim 1, wherein the computer-executable instructions, when executed by the one or more processors, cause the one or more processors to perform further operations comprising requesting, as the alphanumeric entry, personal information of the buyer.

8. The non-transitory computer-readable medium of claim 1, wherein the computer-executable instructions, when executed by the one or more processors, cause the one or more processors to perform further operations comprising requesting a second alphanumeric entry as part of the second set of user inputs, wherein the second alphanumeric entry is selected from a group consisting of a password, a secret code, and a PIN.

9. The non-transitory computer-readable medium of claim 1, wherein the computer-executable instructions, when executed by the one or more processors, cause the one or more processors to perform further operations comprising authenticating the second alphanumeric user input and the biometric user input by determining that the second alphanumeric user input and the biometric user input match verified user inputs.

10. The non-transitory computer-readable medium of claim 1, wherein the second authentication request identifies a good or service subject to the second transaction, wherein the second set of user inputs includes a verification of the good or service subject of the second transaction, and wherein the verification of the good or service of the second transaction is received, using the network interface in communication with the one or more processors, via the communication network, from the buyer device responsive to the second information request.

11. A computer-implemented method for authenticating, via an authentication server comprising one or more processors, electronic transactions involving seller devices of sellers and buyer devices of buyers, the method comprising:

receiving, by a network interface in communication with the one or more processors, from a first seller device via a communication network, a first authentication request to authenticate information of a buyer for a first transaction, the first authentication request comprising a first seller device location and a first transaction value;

determining, by the processor, based on a comparison of the first transaction value to a lower level transaction threshold, and based on the first seller device location, that a lower level of authentication is required for the first transaction;

in response to determining that the lower level of authentication is required for the first transaction, transmitting, to a client application at a buyer device of the buyer, by the network interface in communication with the one or more processors, via the communication network, a first information request for a first set of one or more user inputs via a first user interface, the first set of one or more user inputs comprising at least an alphanumeric entry;

receiving, from the buyer device responsive to the first information request, by the network interface in communication with the one or more processors, via the communication network, an alphanumeric user input provided to the first user interface of the client application; authenticating, by the processor, the alphanumeric user input from the buyer device by comparing the alphanumeric user input with information stored in an account of the buyer to verify that the alphanumeric user input is associated with the buyer;

in response to authenticating the alphanumeric user input, transmitting, to the first seller device, by the network interface in communication with the one or more processors, via the communication network, a first authentication message comprising an indication the buyer is authenticated for the first transaction;

receiving, from a second seller device of the second seller, by the network interface in communication with the one or more processors, via the communication network, a second authentication request to authenticate the buyer for a second transaction, the second authentication request comprising a second transaction location and a second transaction value;

in response to determining that a higher level of authentication is required, transmitting, to the buyer device, by the network interface in communication with the one or more processors, via the communication network, a second information request for a second set of user inputs via a plurality of user interfaces, the second set of user inputs comprising at least a biometric user input, each of the plurality of user interfaces accepting one of a second alphanumeric input and the biometric user input;

receiving, from the buyer device, via the communication network, responsive to the second information request, by the network interface in communication with the one or more processors, the second alphanumeric input and the biometric user input;

authenticating, by the processor, the second alphanumeric input and the biometric user input received from the buyer device by comparing the biometric user input and the second alphanumeric input with digitally signed biometric information and second information stored in the account of the buyer, respectively, to verify that the biometric user input and the second alphanumeric input are associated with the buyer; and in response to authenticating the biometric user input and the second alphanumeric input, transmitting, to the second seller device, using the network interface in communication with the one or more processors, via the communication network, a second authentication message comprising an indication the buyer is authenticated for the second transaction.

12. The method of claim 11, further comprising:
determining, by the processor, that the first transaction value of the first authentication request is below a threshold, wherein determining that the lower level of authentication is required for the first transaction comprises determining, by the authentication server and in response to determining that the first transaction value is below the threshold, that the lower level of authentication is required for the first transaction; and determining, by the processor, that the second transaction value of the second authentication request is at least as large as the threshold, wherein determining that the higher level of authentication is required for the second transaction comprises determining, by the authentication server and in response to determining that the second transaction value is at least as large as the threshold, that the higher level of authentication is required for the second transaction.

13. The method of claim 12, wherein determining the threshold comprises determining, by the processor, the threshold based on an analysis of prior transactions of the buyer.

14. The method of claim 11, wherein the biometric user input requested in the second information request is a picture taken by a camera.

15. The method of claim 11, wherein authenticating the alphanumeric user input and the biometric user input comprises determining, by the processor, that the second alphanumeric user input and the biometric user input match verified user inputs.

16. A computer-implemented method for authenticating, via an authentication server comprising one or more processors, electronic transactions involving seller devices of sellers and buyer devices of buyers, the method comprising:
receiving, by a network interface in communication with the one or more processors, from a seller device of a seller, via a communication network, a first authentication request to authenticate information of a first buyer for a first transaction, the first authentication request comprising a seller device location and a first transaction value;

in response to determining that a lower level of authentication is required for the first transaction, transmitting, to a first client application at a first buyer device of the first buyer, by the network interface in communication with the one or more processors, via the communication network, a first information request for a first set of one or more user inputs via a first user interface, the first set of one or more user inputs comprising at least an alphanumeric entry;

receiving, from the first buyer device responsive to the first information request, by the network interface in communication with the one or more processors, via the communication network, an alphanumeric user input provided to the first user interface of the first information wallet application;

authenticating, by the processor, the alphanumeric user input from the first buyer device by comparing the alphanumeric user input with information stored in a first account of the first buyer to verify that the alphanumeric user input is associated with the first buyer;

in response to authenticating the alphanumeric user input, transmitting, to the seller device, by the network interface in communication with the one or more processors, via the communication network, a first authentication message comprising an indication the first buyer is authenticated for the first transaction;

receiving, from the seller device of the seller, by the network interface in communication with the one or more processors, via the communication network, a second authentication request to authenticate the second buyer for a second transaction, the second authentication request comprising a second transaction location, a good or service subject to the second transaction, and a second transaction value;

in response to determining that a higher level of authentication is required, transmitting, to a second client application at a second buyer device of the second buyer, by the network interface in communication with the one or more processors, via the communication network, a second information request for a second set of user inputs via a plurality of user interfaces, the second set of user inputs comprising at least a biometric user input, each of the plurality of user interfaces accepting one of a second alphanumeric input, the biometric user input, and a verification of the good or service subject of the second transaction;

receiving, from the second buyer device responsive to the second information request, by the network interface in communication with the one or more processors, via the communication network, the second alphanumeric input, the biometric user input, and the verification of the good or service of the second transaction;

authenticating, by the processor, the second alphanumeric input and the biometric user input received from the second buyer device by comparing the biometric user input and the second alphanumeric input with digitally signed biometric information and second information stored in a second account of the second buyer, respectively, to verify that the biometric user input and the second alphanumeric input are associated with the second buyer; and in response to authenticating the biometric user input and the second alphanumeric input, transmitting, to the seller device, by the network interface in communication with the one or more processors, via the communication network, a second authentication message comprising an indication the second buyer is authenticated for the second transaction.

17. The method of claim 16, further comprising:

determining, by the processor, that the first transaction value of the first authentication request is below a first threshold, wherein determining that the lower level of authentication is required for the first transaction comprises determining, by the authentication server and in response to determining that the first transaction value is below the first threshold, that the lower level of authentication is required for the first transaction; and determining, by the processor, that the second transaction value of the second authentication request is at least as large as a second threshold, wherein determining that the higher level of authentication is required for the second transaction comprises determining, by the authentication server and in response to determining that the second transaction value is at least as large as the second threshold, that the higher level of authentication is required for the second transaction.

18. The method of claim 17, wherein determining the first threshold comprises determining, by the processor, the first threshold based on an analysis of prior transactions of the first buyer.

19. The method of claim 17, wherein determining the second threshold comprises determining, by the processor, the second threshold based on an analysis of prior transactions of the second buyer.

20. The method of claim 16, wherein the alphanumeric entry is selected from a group consisting of a password, a secret code, a personal identification number (PIN), and personal information.

\* \* \* \* \*